(12) United States Patent
Ogihara et al.

(10) Patent No.: US 12,491,148 B2
(45) Date of Patent: *Dec. 9, 2025

(54) ADENOSINE PHOSPHATE-CONTAINING O/W TYPE EMULSION COMPOSITION HAVING LOW VISCOSITY

(71) Applicant: OTSUKA PHARMACEUTICAL CO., LTD., Tokyo (JP)

(72) Inventors: Miyoko Ogihara, Osaka (JP); Momoko Suma, Osaka (JP); Shiori Miyawaki, Osaka (JP)

(73) Assignee: OTSUKA PHARMACEUTICAL CO., LTD., Tokyo (JP)

(*) Notice: Subject to any disclaimer, the term of this patent is extended or adjusted under 35 U.S.C. 154(b) by 975 days.

This patent is subject to a terminal disclaimer.

(21) Appl. No.: 17/606,252

(22) PCT Filed: Apr. 24, 2020

(86) PCT No.: PCT/JP2020/017780
§ 371 (c)(1),
(2) Date: Oct. 25, 2021

(87) PCT Pub. No.: WO2020/218546
PCT Pub. Date: Oct. 29, 2020

(65) Prior Publication Data
US 2022/0202684 A1 Jun. 30, 2022

(30) Foreign Application Priority Data

Apr. 26, 2019 (WO) .................. PCT/JP2019/018085

(51) Int. Cl.
| A61K 8/60 | (2006.01) |
| A61K 8/06 | (2006.01) |
| A61K 8/34 | (2006.01) |
| A61K 8/44 | (2006.01) |
| A61K 8/73 | (2006.01) |
| A61K 8/81 | (2006.01) |
| A61K 8/86 | (2006.01) |
| A61Q 19/02 | (2006.01) |

(52) U.S. Cl.
CPC .............. *A61K 8/606* (2013.01); *A61K 8/062* (2013.01); *A61K 8/345* (2013.01); *A61K 8/44* (2013.01); *A61K 8/73* (2013.01); *A61K 8/8147* (2013.01); *A61K 8/8152* (2013.01); *A61K 8/86* (2013.01); *A61Q 19/02* (2013.01)

(58) Field of Classification Search
None
See application file for complete search history.

(56) References Cited

U.S. PATENT DOCUMENTS

| 2003/0185770 A1 | 10/2003 | Birrenbach |
| 2004/0029761 A1 | 2/2004 | Wakamatsu et al. |
| 2005/0220827 A1 | 10/2005 | Tanaka et al. |
| 2008/0014231 A1 | 1/2008 | Okano |
| 2010/0145255 A1 | 6/2010 | Popescu et al. |
| 2011/0112045 A1 | 5/2011 | Wakamatsu |
| 2011/0250246 A1 | 10/2011 | Suzuki et al. |
| 2012/0295989 A1 | 11/2012 | Okubo |
| 2015/0216766 A1 | 8/2015 | Tanaka et al. |
| 2016/0256379 A1* | 9/2016 | Stangl .................. A61K 36/258 |
| 2016/0324737 A1 | 11/2016 | Kako et al. |

FOREIGN PATENT DOCUMENTS

| CN | 106963658 A | 7/2017 |
| EP | 2939657 A1 | 11/2015 |
| EP | 3960245 A1 | 3/2022 |
| JP | H09-019631 A | 1/1997 |
| JP | H11-071259 A | 3/1999 |
| JP | 2002-234830 A | 8/2002 |
| JP | 2003-206224 A | 7/2003 |
| JP | 2003-306411 A | 10/2003 |
| JP | 2003-532665 A | 11/2003 |
| JP | 2007-169240 A | 7/2007 |
| JP | 2008-291014 A | 12/2008 |
| JP | 2009-286757 A | 12/2009 |
| JP | 2014-505699 A | 3/2014 |
| JP | 2014-70063 A | 4/2014 |
| JP | 2018-016584 A | 2/2018 |
| JP | 2019-014709 A | 1/2019 |
| WO | 02/041853 A1 | 5/2002 |
| WO | 03/097072 A1 | 11/2003 |
| WO | 2009/148059 A1 | 12/2009 |
| WO | 2012/104604 A2 | 8/2012 |

(Continued)

OTHER PUBLICATIONS

Abelman (Why the pH balance of your skin-care products matters so much, Dec. 20, 2018). (Year: 2018).*
International Search Report dated Jun. 23, 2020 in International Application No. PCT/JP2020/017780.
International Search Report dated Jul. 2, 2019 in International Application No. PCT/JP2019/018085.
International Preliminary Report on Patentability with Translation of the Written Opinion dated Nov. 4, 2021 in International Application No. PCT/JP2020/017780.

(Continued)

*Primary Examiner* — Melissa S Mercier
(74) *Attorney, Agent, or Firm* — Sughrue Mion, PLLC

(57) ABSTRACT

The present disclosure provides an O/W emulsion composition,
comprising an adenosine phosphate and/or a salt thereof; an acrylic acid-alkyl methacrylate copolymer; an oil content; and water; and
comprising a water-soluble polymer selected from a swelling thickener, an associative thickener, a polysaccharide and a derivative thereof and a mixture thereof, and/or a pH adjuster which is an organic alkali compound;
wherein the composition has a viscosity of less than 10,000 mPa·s.

16 Claims, No Drawings

(56) References Cited

FOREIGN PATENT DOCUMENTS

| WO | 2013/132914 A1 | 9/2013 | |
|---|---|---|---|
| WO | 2015/107709 A1 | 7/2015 | |
| WO | WO-2018219972 A1 * | 12/2018 | ............. A61K 8/042 |

OTHER PUBLICATIONS

International Preliminary Report on Patentability with Translation of the Written Opinion dated Nov. 4, 2021 in International Application No. PCT/JP2019/018085.

Extended European Search Report issued Jun. 15, 2023 in European Application No. 20794475.2.

Mintel, "Primitive Whitening Essence", Database GNPD (Online), Database Accession No. 1388689, May 2010 (4 pages total).

Mintel, "DécolletéSerum", Database GNPD (Online), Database Accession No. 5736937, Jun. 2018 (5 pages total).

Mintel, "Re-Nutriv Lifting Serum", Database GNPD (Online), Database Accession No. 189556, Feb. 2003 (3 pages total).

Mintel, "Maximum Moisture Lotion", Database GNPD (Online), Database Accession No. 1247640, Jan. 2010 (6 pages total).

International Preliminary Report on Patentability dated Nov. 4, 2021 in International Application No. PCT/JP2019/018099, corresponding to U.S. Appl. No. 17/606,276.

International Preliminary Report on Patentability dated Nov. 4, 2021 in International Application No. PCT/JP2020/017786, corresponding to U.S. Appl. No. 17/606,276.

International Search Report dated Jul. 2, 2019 in International Application No. PCT/JP2019/018099, corresponding to U.S. Appl. No. 17/606,276.

International Search Report dated Jun. 23, 2020 in International Application No. PCT/JP2020/017786, corresponding to U.S. Appl. No. 17/606,276.

Extended European Search Report dated Dec. 16, 2022 from the European Patent Office in EP Application No. 20795566.7, corresponding to U.S. Appl. No. 17/606,276.

Office Action issued Jun. 24, 2024 in U.S. Appl. No. 17/606,276.

Office Action issued Jan. 30, 2025 in U.S. Appl. No. 17/606,276.

* cited by examiner

ADENOSINE PHOSPHATE-CONTAINING O/W TYPE EMULSION COMPOSITION HAVING LOW VISCOSITY

CROSS REFERENCE TO RELATED APPLICATIONS

This application is a National Stage of International Application No. PCT/JP2020/017780 filed Apr. 24, 2020, claiming priority based on International Application. No. PCT/JP2019/018085 filed Apr. 26, 2019.

TECHNICAL FIELD

The present invention relates to a low viscosity O/W emulsion composition comprising an adenosine phosphate and/or a salt thereof, and an acrylic acid-alkyl methacrylate copolymer.

BACKGROUND ART

An adenosine phosphate is known to have a moisturizing effect and a whitening effect, and cosmetics containing an adenosine phosphate have already been studied in various ways (for example, Patent Document 1), and have been put on the market.

Alkyl acrylate copolymers are known as polymeric emulsifiers suitable for the formulation of gel creams and emulsions having a lightly and fresh feeling during use.

PRIOR ART DOCUMENT

Patent Document

[Patent Document 1] WO 2002/41853

The disclosures of the prior art documents cited herein are hereby incorporated by reference in their entirety.

SUMMARY

Technical Problem

The present inventors attempted to develop an O/W emulsion composition containing an adenosine phosphate and an acrylic acid-alkyl methacrylate copolymer and having a low viscosity (less than 10,000 mPa·s), but encountered the problem of not being able to obtain a composition having a good emulsification stability. The object of the present invention is to provide a low viscosity (less than 10,000 mPa·s) O/W emulsion composition comprising an adenosine phosphate and/or a salt thereof and an acrylic acid-alkyl methacrylate copolymer and having a good emulsification stability.

Solution to Problem

The present inventors have found that unexpectedly, a specific water-soluble polymer and a specific pH adjuster respectively improve the emulsification stability of a composition comprising an adenosine phosphate and/or a salt thereof and an acrylic acid-alkyl methacrylate copolymer.

In addition, the present inventors have found that an addition of an uncrystallized high melting point oil having a melting point of 30° C. or higher; an oil-based gelling agent; and/or a silicone agent for improving feel further improve the feel during use of the composition.

Specifically, the present application provides the following aspects of the invention.

[1] An O/W emulsion composition,
comprising Ingredient (A), Ingredient (B), Ingredient (E), and Ingredient (F); and
comprising Ingredient (C) and/or Ingredient (D);
wherein
Ingredient (A): an adenosine phosphate and/or a salt thereof;
Ingredient (B): an acrylic acid-alkyl methacrylate copolymer;
Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water, and
wherein the composition has a viscosity of less than 10,000 mPa·s (for example, 200 to 10,000 mPa·s, 300 to 9,000 mPa·s, 500 to 8,000 mPa·s, 1,000 to 5,000 mPa·s, 1,500 to 3,000 mPa·s).

[2] The composition according to [1], wherein Ingredient (B) is an acrylic acid-alkyl methacrylate copolymer having a molecular weight of 100,000 to 5,000,000.

[3] The composition according to [1] or [2], wherein Ingredient (B) is an acrylic acid-alkyl methacrylate copolymer wherein the alkyl group has 8 to 35 carbon atoms.

[4] The composition according to any one of [1] to [3], wherein Ingredient (B) is acrylates/C10-30 alkyl acrylate crosspolymer.

[5] The composition according to any one of [1] to [4], wherein Ingredient (C) is a water-soluble polymer selected from:
a swelling thickener selected from sodium polyacrylate, ammonium polyacrylate, acrylamide/sodium acrylate copolymer, vinylpyrrolidone/2-acrylamide-2-methylpropanesulfonic acid copolymer, a mixture of polyacrylamide and sodium polyacrylate, sodium acrylate/2-acrylamide-2-methylpropanesulfonic acid copolymer, hydroxyethyl acrylate/2-acrylamide-2-methylpropanesulfonic acid copolymer, and a mixture thereof;
an associative thickener selected from a polyacrylic acid-based associative thickener, polyvinyl alcohol, a polyvinyl-based thickener, a polyether-based associative thickener, a polyglycol-based associative thickener, a maleic anhydride copolymer-based associative thickener, a polyamide-based associative thickener, a polyester-based associative thickener, a hydrophobic cellulose ester-based associative thickener, a urethane associative thickener, a polycarboxylic acid-based associative thickener, and a mixture thereof;
a polysaccharide selected from xanthan gum, guar gum, carrageenan, tamarind gum, quince seed gum, sclerotium gum, agar, cationic xanthan gum, cationic cellulose, hydroxypropyl starch phosphate, and a mixture thereof, and a derivative thereof; and
a mixture thereof.

[6] The composition according to any one of [1] to [5], wherein Ingredient (C) is a water-soluble polymer selected from:
a swelling thickener selected from sodium polyacrylate, ammonium polyacrylate, acrylamide/sodium acrylate copolymer, vinylpyrrolidone/2-acrylamide-2-methylpropanesulfonic acid copolymer, a mixture of polyacrylamide and sodium polyacrylate, sodium acrylate/

2-acrylamide-2-methylpropanesulfonic acid copolymer, hydroxyethyl acrylate/2-acrylamide-2-methylpropanesulfonic acid copolymer, and a mixture thereof;
a urethane associative thickener selected from PEG-240/HDI copolymer bis-decyltetradeceth-20 ether, PEG-150/stearyl alcohol/SMDI copolymer, PEG-150/decyl alcohol/SMDI copolymer, polyurethane-59, and a mixture thereof; and
a mixture thereof.

[7] The composition according to any one of [1] to [6], wherein Ingredient (C) is selected from sodium polyacrylate, PEG-240/HDI copolymer bis-decyltetradeceth-20 ether, and a mixture thereof.

[8] The composition according to any one of [1] to [7], wherein Ingredient (C) is sodium polyacrylate.

[9] The composition according to any one of [1] to [8], wherein Ingredient (D) is a pH adjuster which is an organic alkali compound selected from tromethamine, aminomethyl propanediol, aminomethyl propanol, arginine, and a mixture thereof.

[10] The composition according to any one of [1] to [9], wherein Ingredient (D) is tromethamine, arginine, and a mixture thereof.

[11] The composition according to any one of [1] to [10], wherein Ingredient (D) is tromethamine.

[12] The composition according to any one of [1] to [11], wherein the composition comprises Ingredient (C), and Ingredient (C)/Ingredient (A) (weight ratio) is 0.01 to 30 (preferably 0.01 to 20, more preferably 0.02 to 10, more preferably 0.03 to 5, even more preferably 0.04 to 0.8, 0.1 to 0.5).

[13] The composition according to any one of [1] to [12], wherein the composition comprises Ingredient (C), and Ingredient (C)/(Ingredient (A)+Ingredient (B)) (weight ratio) is 0.005 to 20 (preferably 0.01 to 10, more preferably 0.02 to 5, even more preferably 0.01 to 1.5, even more preferably 0.04 to 0.7, 0.1 to 0.3).

[14] The composition according to any one of [1] to [13], wherein the composition has a pH of 5.5 to 7.5 (preferably pH 6 to 7, for example, pH 6.5 to 7).

[15] The composition according to any one of [1] to [14], wherein the composition comprises Ingredient (D) and has a pH of 5.5 to 7.5 (preferably pH 6 to 7, for example, pH 6.5 to 7).

[16] The composition according to any one of [1] to [15], wherein
the composition does not comprise a pH adjuster which is an inorganic alkali compound, or
the composition comprises a pH adjuster which is an inorganic alkali compound, and the pH adjuster which is an inorganic alkali compound/Ingredient (D) (weight ratio) is 0.1 or less (preferably 0.01 or less).

[17] The composition according to any one of [1] to [16], wherein Ingredient (C)/Ingredient (B) (weight ratio) is 0.05 to 60 (preferably 0.1 to 30, more preferably 0.1 to 20, even more preferably 0.1 to 10, still more preferably 0.1 to 5, still more preferably 0.5 to 4, 0.3 to 1).

[18] The composition according to any one of [1] to [17], wherein the composition comprises 0.001 to 10% by weight (preferably 0.01 to 10% by weight, more preferably 0.1 to 7% by weight, more preferably 0.2 to 5% by weight, even more preferably 0.3 to 4% by weight, still more preferably 0.4 to 3.5% by weight, 1 to 5% by weight, 0.4 to 5% by weight) of Ingredient (A).

[19] The composition according to any one of [1] to [18], wherein the composition comprises 0.05 to 2% by weight (preferably 0.1 to 1.5% by weight, more preferably 0.15 to 1% by weight, even more preferably 0.15 to 0.8% by weight, still more preferably 0.2 to 0.4% by weight) of Ingredient (B).

[20] The composition according to any one of [1] to [19], wherein the composition comprises 0.01 to 10% by weight (preferably 0.01 to 8% by weight, more preferably 0.03 to 4% by weight, more preferably 0.1 to 4% by weight, even more preferably 0.1 2% by weight, still more preferably 0.2 to 0.8% by weight) of Ingredient (C).

[21] The composition according to any one of [1] to [20], wherein the composition comprises 0.1 to 50% by weight (preferably 1 to 30% by weight, more preferably 2 to 25% by weight, more preferably 3 to 23% by weight, even more preferably 4 to 20% by weight, still more preferably 5 to 16% by weight, 5 to 8% by weight) of Ingredient (E).

[22] The composition according to any one of [1] to [21], wherein the composition comprises 20 to 99% by weight (preferably 30 to 99% by weight, more preferably 40 to 99% by weight, more preferably 50 to 99% by weight, even more preferably 60 to 95% by weight, still more preferably 70 to 90% by weight) of Ingredient (F).

[23] The composition according to any one of [1] to [22], wherein Ingredient (E) comprises Ingredient (G) selected from an uncrystallized high melting point oil having a melting point of 30° C. or higher; an oil-based gelling agent; a silicone agent for improving feel; and a mixture thereof.

[24] The composition according to any one of [23], wherein Ingredient (G) is selected from:
an uncrystallized high melting point oil having a melting point of 30° C. or higher selected from an uncrystallized triglyceride having a melting point of 30° C. or higher; an uncrystallized sterol fatty acid ester having a melting point of 30° C. or higher; petrolatum; and a mixture thereof;
an oil-based gelling agent selected from an inulin fatty acid ester, a dextrin fatty acid ester, polyglycerol, dibutyl ethylhexanoyl glutamide, dibutyl lauroyl glutamide, sodium dilauramidoglutamide lysine, vinyl dimethicone/methicone silsesquioxane crosspolymer, PEG/PPG-19/19 dimethicone, and a mixture thereof;
a silicone agent for improving feel selected from an amino-modified silicone, a silicone wax, polyether-modified silicone, highly polymerized dimethicone, a silicone wax, a silicone emulsion, a silicone powder, and a mixture thereof; and
a mixture thereof.

[25] The composition according to [23] or [24], wherein Ingredient (G) is selected from caprylic/capric/myristic/stearic triglyceride, theobroma grandiflorum seed butter, phytosteryl/behenyl/octyldodecyl lauroyl glutamate, an inulin fatty acid ester (for example, stearoyl inulin), a dextrin fatty acid ester (for example, dextrin myristate), an amino-modified silicone (for example, aminopropyl dimethicone), a silicone wax (for example, stearyl dimethicone), and a mixture thereof.

[26] The composition according to any one of [23] to [25], wherein Ingredient (G) is selected from caprylic/capric/myristic/stearic triglyceride, theobroma grandiflorum seed butter, phytosteryl/behenyl/octyldodecyl lauroyl glutamate, and a mixture thereof.

[27] The composition according to any one of [23] to [25], wherein Ingredient (G) is selected from an inulin fatty acid ester (for example, stearoyl inulin), a dextrin fatty acid ester (for example, dextrin myristate), and a mixture thereof.

[28] The composition according to any one of [23] to [25], wherein Ingredient (G) is selected from an amino-modified silicone (for example, aminopropyl dimethicone), a silicone wax (for example, stearyl dimethicone), and a mixture thereof.

[29] The composition according to any one of [23] to [28], wherein the amount of Ingredient (G) is 0.1 to 50% by weight (preferably 1 to 30% by weight, more preferably 2.5 to 25% by weight) based on Ingredient (E).

[30] The composition according to any one of [23] to [26], and [29], wherein Ingredient (G) is an uncrystallized high melting point oil having a melting point of 30° C. or higher, and the amount of Ingredient (G) is 0.01 to 50% by weight (preferably 0.1 to 40% by weight, more preferably 6 to 25% by weight) based on Ingredient (E).

[31] The composition according to any one of [23] to [25], [27], and [29], wherein Ingredient (G) is an oil-based gelling agent, and the amount of Ingredient (G) is 0.01 to 50% by weight (preferably 0.1 to 20% by weight, more preferably 2.5 to 6.25% by weight) based on Ingredient (E).

[32] The composition according to any one of [23] to [25], [28], and [29], wherein Ingredient (G) is a silicone agent for improving feel, and the amount of Ingredient (G) is 0.01 to 50% by weight (preferably 0.1 to 20% by weight, more preferably 0.5 to 15% by weight, still more preferably 1 to 10% by weight) based on Ingredient (E).

[33] The composition according to any one of [23] to [32], wherein the composition comprises 0.001 to 10% by weight (preferably 0.01 to 10% by weight, more preferably 0.1 to 7% by weight, more preferably 0.1 to 5% by weight, even more preferably 0.2 to 3% by weight, still more preferably 0.2 to 2% by weight) of Ingredient (G).

[34] The composition according to any one of s [1] to [33], wherein the composition further comprises
Ingredient (H): a water-soluble humectant.

[35] The composition according to any one of [1] to [34], wherein Ingredient (H) is a water-soluble humectant selected from a low-polarity polyhydric alcohol (for example, butylene glycol, bis-ethoxydiglycol cyclohexane 1,4-dicarboxylate, dipropylene glycol, PEG/PPG/polybutylene glycol-8/5/3 glycerin, POE methylglucoside), a saccharide (for example, glyceryl glucoside, diglycerin, trehalose, a sorbitol culture polysaccharide solution), a film forming agent (for example, pullulan, PVP, gum arabic), and a mixture thereof.

[36] The composition according to any one of [1] to [35] comprising
Ingredient (A): an adenosine phosphate and/or a salt thereof;
Ingredient (B): acrylates/C10-30 alkyl acrylate crosspolymer;
Ingredient (C): cross-linked sodium polyacrylate and/or PEG-240/HDI copolymer bis-decyltetradeceth-20 ether (preferably cross-linked sodium polyacrylate);
Ingredient (E): an oil content; and
Ingredient (F): water,
wherein the composition has a viscosity of 1,500 to 8,000 mPa·s.

[37] The composition according to [36], wherein Ingredient (C)/(Ingredient (A)+Ingredient (B)) (weight ratio) is 0.04 to 0.7.

[38] The composition according to any one of [1] to [37] comprising
Ingredient (A): an adenosine phosphate and/or a salt thereof 1.5 to 3.5% by weight;
Ingredient (B): acrylates/C10-30 alkyl acrylate crosspolymer 0.2 to 0.4% by weight;
Ingredient (C): cross-linked sodium polyacrylate and/or PEG-240/HDI copolymer bis-decyltetradeceth-20 ether (preferably cross-linked sodium polyacrylate) 0.04 to 0.8% by weight;
Ingredient (E): an oil content 5 to 8% by weight; and
Ingredient (F): water,
wherein the composition has a viscosity of 1,500 to 8,000 mPa·s.

[39] The composition according to any one of [1] to [38] comprising
Ingredient (A): an adenosine phosphate and/or a salt thereof;
Ingredient (B): acrylates/C10-30 alkyl acrylate crosspolymer;
Ingredient (D): tromethamine and/or arginine;
Ingredient (E): an oil content; and
Ingredient (F): water,
wherein the composition has a viscosity of 1,500 to 8,000 mPa·s, and a pH of 6 to 7.

[40] The composition according to any one of [1] to [39] comprising
Ingredient (A): an adenosine phosphate and/or a salt thereof 1.5 to 3.5% by weight;
Ingredient (B): acrylates/C10-30 alkyl acrylate crosspolymer 0.2 to 0.4% by weight;
Ingredient (D): tromethamine, aminomethyl propanediol, and/or arginine;
Ingredient (E): an oil content 5 to 8% by weight; and
Ingredient (F): water,
wherein the composition has a viscosity of 1,500 to 8,000 mPa·s, and a pH of 6 to 7.

[41] The composition according to any one of [1] to [40], which is a lotion; an emulsion selected from an emollient emulsion, a milky lotion, a nourishing emulsion, and an cleansing emulsion; a cream selected from an emollient cream, a massage cream, a cleansing cream, and a makeup cream; a lip balm.

[42] The composition according to any one of [1] to [41], which is applied to or sprayed on skin.

[43] A method for producing an O/W emulsion composition having a viscosity of less than 10,000 mPa·s,
comprising mixing Ingredient (A), Ingredient (B), Ingredient (E), and Ingredient (F) in the presence of Ingredient (C) and/or Ingredient (D),
wherein
Ingredient (A): an adenosine phosphate and/or a salt thereof;
Ingredient (B): an acrylic acid-alkyl methacrylate copolymer;
Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water.

[44] A method for improving an emulsification stability of an O/W emulsion composition comprising Ingredient (A), Ingredient (B), Ingredient (E), and Ingredient (F) and having a viscosity of less than 10,000 mPa·s,
comprising adding Ingredient (C) and/or Ingredient (D),
wherein
Ingredient (A): an adenosine phosphate and/or a salt thereof;
Ingredient (B): an acrylic acid-alkyl methacrylate copolymer;

Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water.

[45] A method for improving a feel during use of an O/W emulsion composition comprising Ingredient (A), Ingredient (B), Ingredient (E), and Ingredient (F) and having a viscosity of less than 10,000 mPa·s,
comprising adding Ingredient (C) and/or Ingredient (D), wherein
Ingredient (A): an adenosine phosphate and/or a salt thereof;
Ingredient (B): an acrylic acid-alkyl methacrylate copolymer;
Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water.

[Item 1]
An O/W emulsion composition,
comprising Ingredient (A), Ingredient (B), Ingredient (E), and Ingredient (F); and
comprising Ingredient (C) and/or Ingredient (D);
wherein
Ingredient (A): an adenosine phosphate and/or a salt thereof;
Ingredient (B): an acrylic acid-alkyl methacrylate copolymer;
Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water, and
wherein the composition has a viscosity of less than 10,000 mPa·s.

[Item 2]
The composition according to Item 1, wherein Ingredient (B) is an acrylic acid-alkyl methacrylate copolymer having a molecular weight of 100,000 to 5,000,000.

[Item 3]
The composition according to Item 1 or 2, wherein Ingredient (C) is a water-soluble polymer selected from:
a swelling thickener selected from sodium polyacrylate, ammonium polyacrylate, ammonium polyacrylate, acrylamide/sodium acrylate copolymer, vinylpyrrolidone/2-acrylamide-2-methylpropanesulfonic acid copolymer, a mixture of polyacrylamide and sodium polyacrylate, sodium acrylate/2-acrylamide-2-methylpropanesulfonic acid copolymer, hydroxyethyl acrylate/2-acrylamide-2-methylpropanesulfonic acid copolymer, and a mixture thereof;
a urethane associative thickener selected from PEG-240/HDI copolymer bis-decyltetradeceth-20 ether, PEG-150/stearyl alcohol/SMDI copolymer, PEG-150/decyl alcohol/SMDI copolymer, polyurethane-59, and a mixture thereof; and
a mixture thereof.

[Item 4]
The composition according to any one of Items 1 to 3, wherein Ingredient (D) is a pH adjuster which is an organic alkali compound selected from tromethamine, aminomethyl propanediol, aminomethyl propanol, arginine, and a mixture thereof.

[Item 5]
The composition according to any one of Items 1 to 4, wherein the composition comprises Ingredient (C), and Ingredient (C)/Ingredient (A) (weight ratio) is 0.01 to 30.

[Item 6]
The composition according to any one of Items 1 to 5, wherein the composition comprises Ingredient (C), and Ingredient (C)/(Ingredient (A)+Ingredient (B)) (weight ratio) is 0.005 to 20.

[Item 7]
The composition according to any one of Items 1 to 6, wherein the composition comprises Ingredient (C), and Ingredient (C)/Ingredient (B) (weight ratio) is 0.05 to 60.

[Item 8]
The composition according to any one of Items 1 to 7, wherein the composition has a pH of 5.5 to 7.5.

[Item 9]
The composition according to any one of Items 1 to 8 comprising
Ingredient (A): an adenosine phosphate and/or a salt thereof;
Ingredient (B): acrylates/C10-30 alkyl acrylate crosspolymer;
Ingredient (C): cross-linked sodium polyacrylate and/or PEG-240/HDI copolymer bis-decyltetradeceth-20 ether;
Ingredient (E): an oil content; and
Ingredient (F): water,
wherein the composition has a viscosity of 1,500 to 10,000 mPa·s.

[Item 10]
The composition according to any one of Items 1 to 9 comprising
Ingredient (A): an adenosine phosphate and/or a salt thereof;
Ingredient (B): acrylates/C10-30 alkyl acrylate crosspolymer;
Ingredient (D): tromethamine and/or arginine;
Ingredient (E): an oil content; and
Ingredient (F): water,
wherein the composition has a viscosity of 1,500 to 10,000 mPa·s, and a pH of 6 to 7.

[Item 11]
The composition according to any one of Items 1 to 10, wherein the composition comprises
0.001 to 10% by weight of Ingredient (A),
0.05 to 2% by weight of Ingredient (B), and
0.1 to 50% by weight of Ingredient (E).

[Item 12]
The composition according to any one of Items 1 to 11, wherein the composition comprises 0.01 to 10% by weight of Ingredient (C).

[Item 13]
The composition according to any one of Items 1 to 12 comprising
Ingredient (A): an adenosine phosphate and/or a salt thereof 0.4 to 3.5% by weight;
Ingredient (B): acrylates/C10-30 alkyl acrylate crosspolymer 0.2 to 0.4% by weight;

Ingredient (C): cross-linked sodium polyacrylate and/or PEG-240/HDI copolymer bis-decyltetradeceth-20 ether 0.04 to 0.8% by weight;
Ingredient (E): an oil content 5 to 8% by weight; and
Ingredient (F): water,
wherein the composition has a viscosity of 1,500 to 10,000 mPa·s.

[Item 14]

The composition according to any one of Items 1 to 13 comprising
Ingredient (A): an adenosine phosphate and/or a salt thereof 0.4 to 3.5% by weight;
Ingredient (B): acrylates/C10-30 alkyl acrylate crosspolymer 0.2 to 0.4% by weight;
Ingredient (D): tromethamine, aminomethyl propanediol, and/or arginine;
Ingredient (E): an oil content 5 to 8% by weight; and
Ingredient (F): water,
wherein the composition has a viscosity of 1,500 to 10,000 mPa·s, and a pH of 6 to 7.

[Item 15]

The composition according to any one of Items 1 to 14, wherein
the composition does not comprise a pH adjuster which is an inorganic alkali compound, or,
the composition comprises a pH adjuster which is an inorganic alkali compound, and the pH adjuster which is an inorganic alkali compound/Ingredient (D) (weight ratio) is 0.1 or less.

[Item 16]

The composition according to any one of 1 to 15, wherein Ingredient (E) comprises Ingredient (G) selected from:
an uncrystallized high melting point oil having a melting point of 30° C. or higher selected from an uncrystallized triglyceride having a melting point of 30° C. or higher; an uncrystallized sterol fatty acid ester having a melting point of 30° C. or higher; petrolatum; and a mixture thereof;
an oil-based gelling agent selected from an inulin fatty acid ester, a dextrin fatty acid ester, polyglycerol, dibutyl ethylhexanoyl glutamide, dibutyl lauroyl glutamide, sodium dilauramidoglutamide lysine, vinyl dimethicone/methicone silsesquioxane crosspolymer, PEG/PPG-19/19 dimethicone, and a mixture thereof;
a silicone agent for improving feel selected from an amino-modified silicone, a silicone wax, polyether-modified silicone, highly polymerized dimethicone, a silicone wax, a silicone emulsion, a silicone powder, and a mixture thereof; and
a mixture thereof, and
wherein the amount of Ingredient (G) is 0.1 to 50% by weight based on Ingredient (E).

[Item 17]

The composition according to any one of Items 1 to 16 wherein the composition comprises 0.1 to 5% by weight of Ingredient (G).

[Item 18]

The composition according to any one of Items 1 to 17, wherein the composition further comprises
Ingredient (H): a water-soluble humectant.

Advantageous Effects of Invention

The present invention provide a low viscosity (less than 10,000 mPa·s) O/W emulsion composition comprising an adenosine phosphate and/or a salt thereof and an acrylic acid-alkyl methacrylate copolymer and having a good emulsification stability. In addition, the feel of the composition during use is improved by adding an uncrystallized high melting point oil having a melting point of 30° C. or higher, an oil-based gelling agent, and/or a silicone agent for improving feel.

In one aspect, the present disclosure provides an O/W emulsion composition (hereinafter sometimes referred to as "the composition of the present invention"),
comprising Ingredient (A), Ingredient (B), Ingredient (E), and Ingredient (F), and
comprising Ingredient (C) and/or Ingredient (D), and
wherein
Ingredient (A): an adenosine phosphate and/or a salt thereof;
Ingredient (B): an acrylic acid-alkyl methacrylate copolymer;
Ingredient (C): a water-soluble polymer selected from a swelling thickener, an associative thickener, a polysaccharide and a derivative thereof, and a mixture thereof;
Ingredient (D): a pH adjuster which is an organic alkali compound;
Ingredient (E): an oil content;
Ingredient (F): water, and
wherein the composition has a viscosity of less than 10,000 mPa·s.

The emulsification stability and/or the feel during use of the low viscosity O/W emulsion composition comprising an adenosine phosphate and/or a salt thereof and an acrylic acid-alkyl methacrylate copolymer may be improved by adding Ingredient (C) and/or Ingredient (D).

As used herein, the term "O/W emulsion composition" means an emulsion composition in which oil is dispersed in an aqueous phase. The method for determine whether a emulsion composition is O/W type is not particularly limited, and can be tested by a commonly used method (for example, dispersion, electrical conduction, dye, dilution, and refractive index methods).

In one embodiment, the viscosity of the composition of the present invention is less than 10,000 mPa·s. The preferred viscosity range of the present composition may vary depending on the use, form, etc., but may include 200 to 10,000 mPa·s, 300 to 9,000 mPa·s, 500 to 8,000 mPa·s, 1,000 to 5,000 mPa·s, 1,500 to 3,000 mPa·s and the like. Further, examples of the lower limit of the viscosity of the composition of the present invention include 200 mPa·s, 300 mPa·s, 500 mPa·s, and 800 mPa·s. Examples of the upper limit include 1,000 mPa·s, 2,000 mPa·s, 3,000 mPa·s, 4,000 mPa·s, 5,000 mPa·s, 6,000 mPa·s, 7,000 mPa·s, 8,000 mPa·s, 9,000 mPa·s, and 10,000 mPa·s. Preferred examples of the range may be shown by a combination of the lower limit and the upper limit.

In the present disclosure, a viscosity of a composition is determined by a single cylinder-type rotational viscometer (B-type viscometer, Tokyo Keiki BM type), rotor No. 1 to 4 at 25° C., 12 rpm or 30 rpm for 1 minute. Alternatively, it may be determined in a manner equivalent to that described above.

In the present application, examples of an adenosine phosphate include adenosine monophosphate (adenosine 2'-monophosphate, adenosine 3'-monophosphate, adenosine 5'-monophosphate etc.), adenosine diphosphate (adenosine 5'-diphosphate etc.), adenosine triphosphate (adenosine 5'-triphosphate etc.), adenosine 3',5'-cyclic phosphate etc., and a single kind of the adenosine phosphate may be used, or any combination of two or more kinds of the adenosine phosphate may be used.

In the present application, a salt of adenosine phosphate (s) is not particularly limited as long as it can be formulated in a cosmetic, a drug or quasi-drug for external use. Examples of salts of adenosine monophosphate include specifically alkali metal salts such as sodium salts, potassium salts and the like; alkaline earth metal salts such as calcium salts, magnesium salts, barium salts and the like; basic amino acid salts such as arginine, lysine and the like; ammonium salts such as ammonium salts, tricyclohexylammonium salts and the like; alkanolamine salts such as monoethanolamine salts, diethanolamine salts, triethanolamine salts, monoisopropanolamine salts, diisopropanolamine salts, triisopropanolamine and the like, and a single kind of the salt of adenosine phosphate(s) may be used, or any combination of two or more kinds of the salt of adenosine phosphate(s) may be used.

The amount of Ingredient (A) comprised in the composition of the present invention may vary depending on the use, form, etc. of the composition, but may be optionally selected from a range of, for example, usually 0.001 to 10% by weight based on the total weight of the composition. Preferably 0.01% by weight to 10% by weight, more preferably 0.1% by weight to 7% by weight, more preferably 0.2% by weight to 5% by weight, even more preferably 0.3% by weight to 4% by weight, still more preferably 0.4% by weight to 3.5% by weight are exemplified. Further preferred range examples include 1 to 5% by weight and 0.4 to 5% by weight. Further examples of the lower limit of the amount range of Ingredient (A) comprised in the composition of the present invention include 0.001% by weight, 0.01% by weight, 0.1% by weight, 0.3% by weight, 0.4% by weight, 0.5% by weight, 0.7% by weight, and 1% by weight, and examples of the upper limit include 1% by weight, 2% by weight, 3% by weight, 3.5% by weight, 4% by weight, 5% by weight, 7% by weight, and 10% by weight, and preferred examples of the range may be shown by a combination of the lower limit and the upper limit.

In the present application, an acrylic acid-alkyl methacrylate copolymer is not particularly limited, and for example, an acrylic acid-alkyl methacrylate copolymer having a molecular weight of 100,000 to 5,000,000 is exemplified. Examples of an acrylic acid-alkyl methacrylate copolymer include an acrylic acid-alkyl methacrylate copolymer wherein the alkyl group has 8 to 35 carbon atoms, more preferably an acrylic acid-alkyl methacrylate copolymer wherein the alkyl group has 10 to 30 carbon atoms (for example, acrylates/C10-30 alkyl acrylate crosspolymer etc.). The structure thereof is not limited, and are appropriately selected according to a purpose. A single kind of the acrylic acid-alkyl methacrylate copolymer may be used, or any combination of two or more kinds of the acrylic acid-alkyl methacrylate copolymer may be used in the composition of the present invention.

The amount of Ingredient (B) comprised in the composition of the present invention may vary depending on the use, form, etc. of the composition, but may be optionally selected from, for example, a range of 0.05 to 2% by weight based on the total weight of the composition. More preferably 0.1% by weight to 1.5% by weight, more preferably 0.15% by weight to 1% by weight, even more preferably 0.15% by weight to 0.8% by weight, still more preferably 0.2% by weight to 0.4% by weight are exemplified. Further, examples of the lower limit of the amount range of Ingredient (B) comprised in the composition of the present invention include 0.05, 0.1% by weight, 0.15% by weight, and 0.2% by weight, and examples of the upper limit include 0.4% by weight, 0.6% by weight, 0.7% by weight, 0.8% by weight, 1% by weight, 1.5% by weight, and 2% by weight, and preferred examples of the range may be shown by a combination of the lower limit and the upper limit.

Examples of a water-soluble polymer of Ingredient (C) which may be comprised in the composition of the present invention include a swelling thickener, an associative thickener, a polysaccharide and a derivative thereof. A single kind of the water-soluble polymer may be used, or any combination of two or more kinds of the water-soluble polymer may be used in the composition of the present invention.

Examples of a swelling thickener include a alkali swelling thickener such as sodium polyacrylate (for example, cross-linked sodium polyacrylate), ammonium polyacrylate, acrylamide/sodium acrylate copolymer, vinylpyrrolidone/2-acrylamide-2-methylpropanesulfonic acid copolymer, a mixture of polyacrylamide and sodium polyacrylate, sodium acrylate/2-acrylamide-2-methylpropanesulfonic acid copolymer, hydroxyethyl acrylate/2-acrylamide-2-methylpropanesulfonic acid copolymer. A single kind of the swelling thickener may be used, or any combination of two or more kinds of the swelling thickener may be used in the composition of the present invention.

Examples of an associative thickener include a polyacrylic acid-based associative thickener: for example, acrylic acid copolymer, acrylates/vinyl neodecanoate crosspolymer, (acrylates/steareth-20 methacrylate crosspolymer, acrylates/steareth-20 methacrylate copolymer, acrylates/beheneth-25 methacrylate copolymer, acrylates/steareth-20 itaconate copolymer and the like; polyvinyl alcohol; a polyvinyl-based thickener; a polyether-based associative thickener; a polyglycol-based associative thickener; a maleic anhydride copolymer-based associative thickener; a polyamide-based associative thickener; a polyester-based associative thickener; a hydrophobic cellulose ester-based associative thickener; a urethane associative thickener: for example, PEG-240/HDI copolymer bis-decyltetradeceth-20 ether, PEG-150/stearyl alcohol/SMDI copolymer, PEG-150/decyl alcohol/SMDI copolymer, polyurethane-59 and the like; a polycarboxylic acid-based associative thickener, and a single kind of the associative thickener may be used, or any combination of two or more kinds of the associative thickener may be used.

Examples of a polysaccharide and a derivative thereof include cationic xanthan gum, cationic cellulose, xanthan gum, guar gum, carrageenan, tamarind gum, quince seed gum, sclerotium gum, hydroxypropyl starch phosphate and agar. A single kind of the polysaccharide and a derivative thereof may be used, or any combination of two or more kinds of the polysaccharide and a derivative thereof may be used.

In the composition of the present invention, the amount of Ingredient (C) is not particularly limited so long as an emulsifying property of the composition is stable and/or the composition exhibits a good feel during use, but the weight ratio of Ingredient (C) to Ingredient (A) (Ingredient (C)/Ingredient (A)) is, for example, 0.01 to 30, preferably 0.01 to 20, more preferably 0.02 to 10, more preferably 0.03 to 5, and even more preferably 0.04 to 0.8. Another preferred range example of the weight ratio is 0.1 to 0.5. Further, examples of the lower limit of the (Ingredient (C)/Ingredient (A)) (weight ratio) include 0.01, 0.02, 0.03, 0.04, 0.1, 0.2, and 0.5, and examples of the upper limit include 0.5, 0.8, 1, 1.5, 2, 3, 5, 10, 20, 30, and preferred examples of the range may be shown by a combination of the lower limit and the upper limit.

Regarding the amount of Ingredient (C) in the composition of the present invention, for example, the weight ratio of Ingredient (C) to the sum of Ingredient (A) and Ingredient (B) (Ingredient (C)/(Ingredient (A)+Ingredient (B)) is 0.005 to 20, preferably 0.01 to 10, more preferably 0.02 to 5, even more preferably 0.01 to 1.5, and even more preferably 0.04 to 0.7. Another preferred range example of the weight ratio is 0.1 to 0.3. Further, examples of the lower limit of the (Ingredient (C)/(Ingredient (A)+Ingredient (B)) (weight ratio) include 0.005, 0.01, 0.02, 0.03, 0.04, and 0.1, and examples of the upper limit include 0.3, 0.7, 1, 1.5, 2, and 5, and preferred examples of the range may be shown by a combination of the lower limit and the upper limit.

In the composition of the present invention, the amount of Ingredient (C) is not particularly limited so long as an emulsifying property of the composition is stable and/or the composition exhibits a good feel during use, but the weight ratio of Ingredient (C) to Ingredient (B) (Ingredient (C)/Ingredient (B)) is, for example, 0.05 to 60, preferably 0.1 to 30, more preferably 0.1 to 20, even more preferably 0.1 to 10, still more preferably 0.1 to 5, still more preferably 0.5 to 4. Another preferred range example of the weight ratio is 0.3 to 1. Further, examples of the lower limit of (Ingredient (C)/Ingredient (B)) (weight ratio) include 0.05, 0.1, 0.2, 0.3, 0.5, and 1, and examples of the upper limit include 60, 30, 20, 15, 10, 8, 5, 4, 3, 2, and 1, and preferred examples of the range may be shown by a combination of the lower limit and the upper limit.

The amount of Ingredient (C) comprised in the composition of the present invention may be optionally selected from, for example, a range of usually 0.01 to 10% by weight based on the total weight of the composition. Preferably 0.01% by weight to 8% by weight, more preferably 0.03% by weight to 4% by weight, more preferably 0.1% by weight to 4% by weight, even more preferably 0.1% by weight to 2% by weight, still more preferably 0.2% by weight to 0.8% by weight are exemplified. Further, examples of the lower limit of the amount range of Ingredient (C) comprised in the composition of the present invention include 0.001% by weight, 0.01% by weight, 0.03% by weight, 0.1% by weight, and 0.2% by weight, and examples of the upper limit include 10% by weight, 7% by weight, 5% by weight, 3% by weight, 2% by weight, 1% by weight, and 0.8% by weight, and preferred examples of the range may be shown by a combination of the lower limit and the upper limit.

Examples of a pH adjuster which is an organic alkali compound of Ingredient (D) include tromethamine, aminomethyl propanediol, aminomethyl propanol, and arginine, and a single kind of the pH adjuster may be used, or any combination of two or more kinds of the pH adjuster may be used.

The preferred pH of the composition of the present invention varies depending on the use, etc. of the composition, and includes, for example, pH 5.5 to 7.5 (preferably pH 6 to 7, such as pH 6.5 to 7). In adjusting the pH of the composition of the present invention, a pH adjuster (for example, a pH adjuster of an inorganic alkali compound (for example, potassium hydroxide, sodium hydroxide)) other than Ingredient (D) may be used to the extent that the effect on the emulsification stability and/or the feeling during use is not problematic. When Ingredient (D) and an inorganic alkali compound are used together, in the composition of the present invention, the weight ratio of the pH adjuster of inorganic alkali compound to Ingredient (D) (a pH adjuster of an inorganic alkali compound/Ingredient (D)) is preferably 0.1 or less (more preferably 0.01 or less). In one embodiment, an organic alkali compound may be used in the composition of the present invention in view of its ability to inhibit discoloration with time and/or change of odour with time of the composition.

In the composition of the present invention, the amount of Ingredient (D) is not particularly limited as long as the emulsification stability and/or the feel during use of the composition is good, and varies depending on the amount of Ingredient (A), the type and amount of other ingredients and the preferred pH of the composition. For example, the weight ratio of Ingredient (D) to Ingredient (A) (Ingredient (D)/Ingredient (A)) is 0.01 to 50 (for example, 0.05 to 40, 0.1 to 30, 0.1 to 20, 0.1 to 10). Further examples of the lower limit of the "Ingredient (D)/Ingredient (A) (weight ratio)" include 0.01, 0.05, and 0.1 and examples of the upper limit include 2, 5, 10, 20, 40 and 50, and preferred examples of the range may be shown by a combination of the lower limit and the upper limit.

In the composition of the present invention, the oil content of Ingredient (E) is not particularly limited.

Specific examples of the oil content includes
  oils, for example vegetable oils such as peanut oil, sesame oil, soybean oil, safflower oil, avocado oil, sunflower oil, corn oil, rapeseed oil, cottonseed oil, castor oil, camellia oil, coconut oil, olive oil, poppy oil, cacao oil, jojoba oil, etc., and animal oils such as beef tallow, pork tallow, wool oil, etc.; and the like;
  hydrocarbon-based liquid oils such as petrolatum, liquid paraffin, squalane, hydrogenated polyisobutene, α-olefin oligomer, etc.;
  higher fatty acid esters such as isopropyl myristate, isopropyl isostearate, myristyl myristate, cetyl ethylhexanoate, cetyl palmitate, cetyl isooctanoate, isocetyl myristate, n-butyl myristate, octyldodecyl myristate, isopropyl linolenate, propyl ricinoleate, isopropyl ricinoleate, pentaerythritol tetraoctanoate, isobutyl ricinoleate, heptyl ricinoleate, diethyl sebacate, diisopropyl adipate, etc.; sterol fatty acid esters such as phytosteryl isostearate, phytosteryl/octyldodecyl lauroyl glutamate, etc.; lanolins and derivatives thereof such as lanolin, lanolin oil, lanolin wax, etc.; waxes such as bleached beeswax, spermaceti, Japan wax, etc.;
  higher aliphatic alcohols such as cetyl alcohol, stearyl alcohol, behenyl alcohol, batyl alcohol, chimyl alcohol, etc.;
  Waxes;
  higher fatty acids such as stearic acid, oleic acid, palmitic acid, etc.;
  mixtures of mono-, di-, tri-glyceride of saturated or unsaturated fatty acids having 12 to 18 carbon atoms;
  silicone oils, for example, chain silicones such as methyl polysiloxane, dimethylpolysiloxane, methylphenylpolysiloxane, methylhydrogenpolysiloxane, etc., cyclic silicones such as cyclopentasiloxane, decamethylcyclopentasiloxane, octamethylcyclotetrasiloxane, methylcyclosiloxane, etc., crosslinked silicones such as crosslinked methylpolysiloxane, crosslinked methylphenylpolysiloxane, etc., modified silicones modified with polyoxyethylene, polyoxypropylene, etc., and the like.

The amount of Ingredient (E) comprised in the composition of the present invention may be optionally selected from a range of, for example, usually 0.1 to 50% by weight based on the total weight of the composition. Preferably 1% by weight to 30% by weight, more preferably 2% by weight to 25% by weight, more preferably 3% by weight to 23% by weight, even more preferably 4% by weight to 20% by weight, still more preferably 5% by weight to 16% by weight, 5% by weight to 8% by weight are exemplified. Further examples of the lower limit of the amount range of Ingredient (E) comprised in the composition of the present invention include 0.1% by weight, 1% by weight, 2% by weight, 3% by weight, 4% by weight, and 5% by weight, and examples of the upper limit include 50% by weight, 30% by weight, 27% by weight, 25% by weight, 23% by weight, 20% by weight, 16% by weight, and preferred examples of the range may be shown by a combination of the lower limit and the upper limit.

In the composition of the present invention, Ingredient (E) may comprise Ingredient (G) selected from an uncrystallized high melting point oil having a melting point of 30° C. or higher; an oil-based gelling agent; a silicone agent for improving feel; and a mixture thereof. The feel during use of the composition of the present invention may be further improved by adding Ingredient (G) to the composition of the present invention.

Regarding the feel during use of the composition of the present invention, an addition of an uncrystallized high melting point oil having a melting point of 30° C. or higher into the composition of the present invention may improve the thickness feeling and the richness feeling while unexpectedly reducing the stickiness feeling and improving the fresh feeling. Although it is generally difficult to obtain a stable emulsification when adding a high melting point oil into an emulsion composition comprising a polymeric emulsifier, it may be easy to obtain a stable emulsification by using an uncrystallized high melting point oil in the emulsion composition.

Examples of an uncrystallized high melting point oil include
an uncrystallized triglyceride having a melting point of 30° C. or higher: for example, caprylic/capric/myristic/stearic triglyceride, theobroma grandiflorum seed butter, Shea butter, hydrogenated palm oil, hydrogenated jojoba oil, jojoba butter, cocoa butter, palm oil, palm kernel oil, hydrogenated oil, coconut acid, PEG-almond glycerides, irvingia gabonensis kernel butter, hydrogenated coco-glycerides, lanolin acid;
petrolatum;
an uncrystallized sterol fatty acid ester having a melting point of 30° C. or higher: for example, phytosteryl macadamiate, polyoxyethylene phytosterol (5E.O.), phytosteryl sunflowerseedate, phytosteryl/behenyl/octyldodecyl lauroyl glutamate, bis-behenyl/isostearyl/phytosteryl dimer dilinoleyl dimer dilinoleate, phytosteryl/isostearyl/cetyl/stearyl/behenyl dimer dilinoleate, raspberry seed oil/tocopheryl succinate aminopropanediol esters, diglyceryl adipate mixed fatty acid ester, bis-diglyceryl polyacyladipate-2).
A single kind of the uncrystallized high melting point oil may be used, or any combination of two or more kinds of the uncrystallized high melting point oil may be used.

Regarding the feel during use of the composition of the present invention, an addition of an oil-based gelling agent into the composition of the present invention may improve the thickness feeling and the richness feeling while unexpectedly reducing the stickiness feeling and improving the fresh feeling. The addition of an oil-based gelling agent may increase the viscosity of the oil phase, may delay an oil release after the application of the composition of the present invention to control the spreadability of oil, which may cause a fresh feeling in addition to a thickness feeling and a smoothness feeling.

Examples of an oil-based gelling agent include an inulin fatty acid ester (for example, stearoyl inulin), a dextrin fatty acid ester (for example, dextrin myristate), polyglycerol, dibutyl ethylhexanoyl glutamide, dibutyl lauroyl glutamide, sodium dilauramidoglutamide lysine, vinyl dimethicone/methicone silsesquioxane crosspolymer, hydrogenated polydecene, hydrogenated styrene/isoprene copolymer, silica silylate and PEG/PPG-19/19 dimethicone.

A single kind of the oil-based gelling agent may be used, or any combination of two or more kinds of the oil-based gelling agent may be used.

Regarding the feel during use of the composition of the present invention, an addition of a silicone agent for improving feel into the composition of the present invention may alleviate the stickiness feeling, may increase the fresh feeling, and may unexpectedly increase the richness feeling and the thickness feeling.

Examples of a silicone agent for improving feel include an amino-modified silicone (for example, aminopropyl dimethicone), a silicone wax (for example, stearyl dimethicone, bis-PEG-18 methyl ether dimethyl silane, C26-28 alkyl dimethicone, C26-28 alkyl methicone, bis-stearoxydimethylsilane, acrylates/stearyl acrylate/dimethicone methacrylate copolymer, acrylates/behenyl acrylate/dimethicone methacrylate copolymer, polyether-modified silicone, highly polymerized dimethicone, a silicone wax, a silicone emulsion, and a silicone powder. A single kind of the silicone agent for improving feel may be used, or any combination of two or more kinds of the silicone agent for improving feel may be used.

The amount of the Ingredient (G) is not particularly limited as long as the emulsification stability and/or the feel during use of the composition are good, but for example, the amount of Ingredient (G) in Ingredient (E) is 0.1 to 50% by weight, preferably 1 to 30% by weight, more preferably 2.5 to 25% by weight relative to Ingredient (E) 100% by weight.

Further, examples of the lower limit of the amount range of Ingredient (G) relative to Ingredient (E) 100% by weight include 0.1% by weight, 0.5% by weight, 1% by weight, 2% by weight, 2.5% by weight, and 5% by weight, and examples of the upper limit include 50% by weight, 40% by weight, 35% by weight, 30% by weight, 25% by weight, and preferred examples of the range may be shown by a combination of the lower limit and the upper limit.

Further, when Ingredient (G) is an uncrystallized high melting point oil having a melting point of 30° C. or higher, the amount of Ingredient (G) in Ingredient (E) is, for example, 0.01 to 50% by weight, preferably 0.1 to 40% by weight, more preferably 6 to 25% by weight relative to Ingredient (E) 100% by weight.

Further, examples of the lower limit of the amount range of Ingredient (G) relative to Ingredient (E) 100% by weight include 0.01% by weight, 0.02% by weight, 0.1% by weight, 1% by weight, 3% by weight, and 6% by weight, and examples of the upper limit include 50% by weight, 40% by weight, 30% by weight, 25% by weight, and preferred examples of the range may be shown by a combination of the lower limit and the upper limit.

Further, when Ingredient (G) is an oil-based gelling agent, the amount of Ingredient (G) in Ingredient (E) is, for example, 0.01 to 50% by weight, preferably 0.1 to 20% by weight, more preferably 2.5 to 6.25% by weight relative to Ingredient (E) 100% by weight.

Further, examples of the lower limit of the amount range of Ingredient (G) relative to Ingredient (E) 100% by weight include 0.01% by weight, 0.1% by weight, 0.5% by weight, 1% by weight, 2% by weight, and 2.5% by weight, and examples of the upper limit include 50% by weight, 30% by weight, 20% by weight, 10% by weight, 6.25% by weight, and preferred examples of the range may be shown by a combination of the lower limit and the upper limit.

Further, when Ingredient (G) is a silicone agent for improving feel, the amount of Ingredient (G) in Ingredient (E) is, for example, 0.01 to 50% by weight, preferably 0.1 to 20% by weight, more preferably 0.5 to 15% by weight, still more preferably 1 to 10% by weight relative to Ingredient (E) 100% by weight.

Further, examples of the lower limit of the amount range of Ingredient (G) relative to Ingredient (E) 100% by weight include 0.01% by weight, 0.1% by weight, 0.5% by weight, 1% by weight, 2% by weight, and 3% by weight, and examples of the upper limit include 50% by weight, 30% by weight, 20% by weight, 15% by weight, 10% by weight, and preferred examples of the range may be shown by a combination of the lower limit and the upper limit.

The amount of Ingredient (G) which may be comprised in the composition of the present invention may be optionally selected from a range of, for example, usually 0.001 to 10% by weight based on the total weight of the composition. Preferably 0.01% by weight to 10% by weight, more preferably 0.1% by weight to 7% by weight, more preferably 0.1% by weight to 5% by weight, even more preferably 0.2% by weight to 3% by weight, still more preferably 0.2% by weight to 2% by weight are exemplified.

Further examples of the lower limit of the amount range of Ingredient (G) which may be comprised in the composition of the present invention include 0.001% by weight, 0.01% by weight, 0.1% by weight, 0.2% by weight, 0.5% by weight, 0.7% by weight, and 1% by weight, and examples of the upper limit include 1% by weight, 2% by weight, 2.5% by weight, 3% by weight, 5% by weight, 7% by weight, 10% by weight, and preferred examples of the range may be shown by a combination of the lower limit and the upper limit.

The composition of the present invention may comprise Ingredient (H): a water-soluble humectant. The addition of a water-soluble humectant may improve the feel during use of the composition of the present invention.

Examples of a water-soluble humectant include a low-polarity polyhydric alcohol (for example, butylene glycol, bis-ethoxydiglycol cyclohexane 1,4-dicarboxylate, dipropylene glycol, PEG/PPG/polybutylene glycol-8/5/3 glycerin, POE methylglucoside), a saccharide (for example, glyceryl glucoside, diglycerin, trehalose, a sorbitol culture polysaccharide solution), and a film forming agent (for example, pullulan, PVP, gum arabic), and a single kind of the water-soluble humectant may be used, or any combination of two or more kinds of the water-soluble humectant may be used.

The amount of Ingredient (H) which may be comprised in the composition of the present invention may be optionally selected from, for example, a range of 0.001 to 50% by weight based on the total weight of the composition. Preferably 0.01% by weight to 30% by weight, more preferably 0.1% by weight to 20% by weight, more preferably 0.5% by weight to 10% by weight are exemplified.

Further, examples of the lower limit of the amount range of Ingredient (H) which may be comprised in the composition of the present invention include 0.001% by weight, 0.01% by weight, 0.1% by weight, 0.5% by weight, and 1% by weight, and examples of the upper limit include 1% by weight, 2% by weight, 3% by weight, 5% by weight, 7% by weight, 10% by weight, 20% by weight, 25% by weight, and 30% by weight, and preferred examples of the range may be shown by a combination of the lower limit and the upper limit.

The amount of water of Ingredient (F) comprised in the composition of the present invention is not particularly limited and may vary depending on the amounts of other ingredients, but may be optionally selected from, for example, a range of usually 20 to 99% by weight based on the total weight of the composition. Preferably 30% by weight to 99% by weight, more preferably 40% by weight to 99% by weight, more preferably 50% by weight to 99% by weight, even more preferably 60% by weight to 95% by weight, still more preferably 70% by weight to 90% by weight are exemplified.

Further, examples of the lower limit of the amount range of Ingredient (F) comprised in the composition of the present invention include 20% by weight, 30% by weight, 40% by weight, 50% by weight, 60% by weight, and 70% by weight, and examples of the upper limit include 99% by weight, 95% by weight, and 90% by weight, and preferred examples of the range may be shown by a combination of the lower limit and the upper limit.

The composition of the present invention may optionally comprise a chelating agent (for example, edetate, etidronic acid, sodium polyphosphate, sodium metaphosphate).

Each ingredient that may be compounded into the composition of the present invention may be in the form of a hydrate.

The composition of the present invention may be prepared in various forms by combining pharmaceutically or cosmetically acceptable base(s) or carrier(s) in addition to the above ingredients. For pharmaceutically or cosmetically acceptable base(s) and carrier(s), conventionally known one(s) can be used. The composition of the present invention may comprise, if required, a wide variety of known ingredients used for externally-applied compositions suitable for the skin or mucous membranes, such as cosmetics, externally-applied medical/quasi-medical drugs, etc. Examples of such ingredients include solvents (for example, cyclomethicone, phytosteryl macadamiate, C12-15 alkyl benzoate, diethylamino hydroxybenzoyl hexyl benzoate), surfactants (for example, isostearic acid), detergent bases (for example, PEG-7 glyceryl cocoate), colorants (dyes and pigments), flavors, preservatives, bactericides ((antibacterials), for example, paraben, phenoxyethanol), thickeners (for example, carboxyvinylpolymer), antioxidants, sequestering agents, cooling agents, deodorizers, humectants (for example, glycerin, pentylene glycol), UV absorbers (for example, 2-ethylhexyl p-methoxycinnamate, octocrylene), UV dispersants, vitamins, plant extracts, skin astringents (for example, ethanol), anti-inflammatory agents (antiphlogistic agents), whitening agents, cell activators, vasodilators, blood circulation accelerators, skin function accelerators, and the like.

The composition of the present invention may be used as a composition for external use to be applied or sprayed on the skin. Specifically, the composition of the present invention may be used as an external preparation (skin preparation) for cosmetics, external medicines or external quasi-medicines.

The form of the composition of the present invention is not particularly limited as long as it can be applied to the skin, and examples thereof include a paste, a mousse, a gel, a liquid, a milky liquid, a suspension liquid, a cream, an ointment, a solid, a sheet, an aerosol, a spray and a liniment. Especially when using as a cosmetic, lotion; emulsions such as emollient emulsion, milky lotion, nourishing emulsion, and cleansing emulsion; cream such as emollient cream, massage cream, cleansing cream, and makeup cream; a lip balm and the like.

EXAMPLE

The present invention is explained in further detail with reference to Formulation Examples and Test Examples. However, the scope of the invention is not limited to these Examples.

Test Example 1

Each of the ingredients were combined together and mixed according to the compositions shown in Table 1 to give skin emulsion compositions of Examples 1 to 6 and Comparative examples 1 to 3. Specifically, the pH was adjusted by ingredient 7 while mixing ingredients 1 to 6, 8 and 9 shown in the table, and the mixture was uniformly mixed to give a gel. The resulting gel was uniformly mixed with ingredient 10 and emulsified.

The viscosity and pH of the resulting emulsion composition was measured, and a centrifugation method and an accelerated test at 60° C. were performed to evaluate the stability of the composition.

The pH was measured at a room temperature of 25° C. using a pH meter F-52 (manufactured by HORIBA, Ltd.).

The viscosity was measured by B-type viscometer. Specifically, the viscosity was measured at a room temperature of 25° C. using BM type viscometer (manufactured by Tokyo Keiki) (rotor No. 3, 12 rpm, 60 seconds). The unit is mPa·s.

The stability was examined using a centrifuge. Specifically, t centrifugation was performed at 2000 rpm for 60 seconds in a centrifuge, himac SCT5BA (manufactured by Hitachi), and the degree of separation was visually evaluated (X: Completely separated, ◎: No change).

TABLE 1

| (Wt %) Ingredient | Comp. Ex. 1 | Ex. 1 | Ex. 2 | Ex. 3 | Comp. Ex. 2 | Ex. 4 | Comp. Ex. 3 | Ex. 5 | Ex. 6 |
|---|---|---|---|---|---|---|---|---|---|
| 1 Purified water | Balance | Balance | Balance | Balance | Balance | Balance | Balance | Balance | Balance |
| 2 Acrylates/C10-30 alkyl acrylate crosspolymer | 0.2 | 0.2 | 0.2 | 0.2 | 0.25 | 0.25 | 0.4 | 0.4 | 0.2 |
| 3 Carboxyvinyl polymer | 0.2 | — | — | — | 0.1 | — | 0.1 | — | — |
| 4 Cross-linked sodium polyacrylate | — | 0.5 | 0.8 | — | — | 0.2 | — | — | 0.2 |
| 5 PEG-240/HDI copolymer bis-decyltetradeceth-20 ether | — | — | — | 0.5 | — | — | — | 0.2 | — |
| 6 Adenosine phosphate | 1 | 1 | 1 | 1 | 1 | 1 | 5 | 5 | 1 |
| 7 Potassium hydroxide | q.s | q.s | q.s | q.s | q.s | q.s | q.s | q.s | q.s |
| 8 1,3-BG | 7 | 7 | 7 | 7 | 3 | 3 | 3 | 3 | 3 |
| 9 Methylparaben | 0.2 | 0.2 | 0.2 | 0.2 | 0.2 | 0.2 | 0.2 | 0.2 | 0.2 |
| 10 Liquid paraffin | 5 | 5 | 5 | 5 | 5 | 5 | 5 | 5 | 5 |
| Total | 100 | 100 | 100 | 100 | 100 | 100 | 100 | 100 | 100 |
| Viscosity | 1312.5 | 1872.5 | 7750 | 6750 | 950 | 6500 | 1162.5 | 2180 | 2400 |
| pH | 6.5 to 7.0 | 6.5 to 7.0 | 6.5 to 7.0 | 6.5 to 7.0 | 6.5 to 7.0 | 6.5 to 7.0 | 6.5 to 7.0 | 6.5 to 7.0 | 6.5 to 7.0 |
| Emulsification stability (Centrifugation 2000 rpm × 1 min) | x | ◎ | ◎ | ◎ | x | ◎ | x | ◎ | ◎ |

Comp. Ex.: Comparative example
Ex.: Example
q.s: quantum sufficit

As shown in Table 1, the emulsification stability of Comparative example 1 to 3 comprising carboxyvinylpolyme was poor. On the other hand, Examples 1 to 6 comprising cross-linked sodium polyacrylate or PEG-240/HDI copolymer bis-decyltetradeceth-20 ether, both of which are water-soluble polymers, showed a good emulsification stability.

Test Example 2

According to the compositions shown in Table 2, each of the ingredients were combined together mixed to give the skin emulsion compositions of Examples 7 to 9 and Comparative example 4. Specifically, while ingredients 1 to 3 and 8 shown in the table were mixed, the pH of the mixture was adjusted by an addition of one of ingredients 4 to 7, and the mixture was uniformly mixed to give a gel. The resulting gel was uniformly mixed with Ingredient 9 and emulsified. The pH and emulsification stability were determined in the same manner as in Test Example 1. In addition, the resulting emulsion compositions were placed in a constant temperature chamber at 60° C. and allowed to stand for 2 weeks, and then the color and odor were evaluated by a sensory evaluation.

TABLE 2

| Ingredient (% by weight) | | Comp. Ex. 4 | Ex. 7 | Ex. 8 | Ex. 9 |
|---|---|---|---|---|---|
| 1 | Purified water | Balance | Balance | Balance | Balance |
| 2 | Acrylates/C10-30 alkyl acrylate crosspolymer | 0.5 | 0.5 | 0.5 | 0.5 |
| 3 | Adenosine phosphate | 3 | 3 | 3 | 3 |
| 4 | Potassium hydroxide | q.s | — | — | — |
| 5 | Tromethamine | — | q.s | — | — |
| 6 | Aminomethyl propanediol | — | — | q.s | — |
| 7 | Arginine | — | — | — | q.s |
| 8 | BG | 3 | 3 | 3 | 3 |
| 9 | Liquid paraffin | 5 | 5 | 5 | 5 |
| | Total | 100 | 100 | 100 | 100 |
| | Viscosity | 4500 | 5600 | 5100 | 5900 |
| | pH | 6.5 | 6.5 | 6.5 | 6.5 |
| | Emulsification stability (Centrifugation 2000 rpm × 1 min) | X | ◉ | ◉ | ◉ |
| | Discoloration | Δ | ◉ | ◉ | Δ |
| | Odor change | X | ◉ | Δ | ◉ |

Comp. Ex.: Comparative example
Ex.: Example
q.s: quantum sufficit

As shown in Table 2, the emulsion stability of Comparative example 4 comprising potassium hydroxide, which is an inorganic alkali compound, was poor. In addition, Comparative example 4 was slightly discolored and markedly changed in odor.

On the other hand, Examples 7 to 9 comprising tromethamine, aminomethyl propanediol or arginine, all of which are organic alkali compounds, showed a good emulsification stability, and the results of discoloration were equivalent to or better than that of Comparative example 4, and the results of odor change were better than that of Comparative example 4.

Test Example 3-1

Each of the ingredients were combined together and mixed according to the compositions shown in Table 3-1 to give the skin emulsion compositions of Example 10 to 13 and Comparative examples 5 to 6. Specifically, while ingredients 1 to 3 and 5 to 7 shown in the table were mixed, the pH of the mixture was adjusted by an addition of the ingredients 4, and the mixture was uniformly mixed to give a gel. The resulting gel was uniformly mixed with ingredient 8 to 12 and emulsified.

A sensory evaluation of Examples 10 to 13 and Comparative examples 5 to 6 was performed by 4 panelists.

As for the feel during use,
the more thickness feeling is, the better result is;
the more richness feeling is, the better result is;
the less stickiness feeling is, the better result is;
the more fresh feeling is, the better result is.

<Sensory Evaluation Score>

The same amount of the test composition (0.1 g) was spread on the inner side of the forearm with a constant force, and the thickness feeling, the richness feeling, the less stickiness feeling, the fresh feeling were scored as below, using point 3 of Comparative example 5 as a reference point. The average points based on 4 panelists were calculated.

5 points: markedly improved
4 points: improved
3 points: no difference
2 points: worsened
1 point: markedly worsened The total sum of each of the average points of the thickness feeling, the richness feeling, the less stickiness feeling, and the fresh feeling was used as an overall score for each sample. A comprehensive evaluation of the feeling during use was rated based on this overall score as follows.

<Comprehensive Evaluation>

"◉" represents that overall score was 17 or more, which shows that the feel during use was improved.
"○" represents that overall score was 13 or more but less than 17, which shows that the feel during use was slightly improved.
"Δ" represents that overall score was 10 or more but less than 13, which shows that no improvement in the feel during use was perceived.
"X" represents that overall score was less than 10, which shows that the feel during use was worsened.

TABLE 3-1

| | Ingredient (% by weight) | Comp. Ex. 5 | Comp. Ex. 6 | Ex. 10 | Ex. 11 | Ex. 12 | Ex. 13 |
|---|---|---|---|---|---|---|---|
| 1 | Purified water | Balance | Balance | Balance | Balance | Balance | Balance |
| 2 | Acrylates/C10-30 alkyl acrylate crosspolymer | 0.5 | 0.5 | 0.5 | 0.5 | 0.5 | 0.5 |
| 3 | Adenosine phosphate | 3 | 3 | 3 | 3 | 3 | 3 |
| 4 | Tromethamine | q.s | q.s | q.s | q.s | q.s | q.s |
| 5 | Glycerin | 3 | 3 | 3 | 3 | 3 | 3 |

TABLE 3-1-continued

| | Ingredient (% by weight) | Comp. Ex. 5 | Comp. Ex. 6 | Ex. 10 | Ex. 11 | Ex. 12 | Ex. 13 |
|---|---|---|---|---|---|---|---|
| 6 | Diglycerin | 1.5 | 1.5 | 1.5 | 1.5 | 1.5 | 1.5 |
| 7 | Pentylene glycol | 3 | 3 | 3 | 3 | 3 | 3 |
| 8 | Liquid paraffin | 8 | 6 | 6 | 7.5 | 6 | 7 |
| 9 | Cetyl alcohol | — | 2 | — | — | — | — |
| 10 | Caprylic/capric/myristic/stearic triglyceride | — | — | 2 | 0.5 | — | — |
| 11 | *Theobroma grandiflorum* seed butter | — | — | — | — | 2 | — |
| 12 | Phytosteryl/behenyl/octyldodecyl lauroyl glutamate | — | — | — | — | — | 1 |
| | pH | 6.5 | 6.5 | 6.5 | 6.5 | 6.5 | 6.5 |
| | Viscosity | 8500 | N/A | 8250 | 8750 | 8750 | 9050 |
| | Thickness feeling | 3 | N/A | 4.75 | 4.25 | 4.75 | 5 |
| | Richness feeling | 3 | N/A | 5 | 4.25 | 4.75 | 4.5 |
| | Less stickiness feeling | 3 | N/A | 4.5 | 3.25 | 4.5 | 3.75 |
| | Fresh feeling | 3 | N/A | 4.75 | 3.75 | 4.75 | 4 |
| | Overall score | 12 | N/A | 19 | 15.5 | 18.75 | 17.25 |
| | Comprehensive evaluation | — | X | ◉ | ○ | ◉ | ◉ |

Comp. Ex.: Comparative example
Ex.: Example
q.s: quantum sufficit
N/A in Thickness, Richnes, Less stickiness, Fresh feelings: Preparation not available
N/A in Overall score: Calculation Not available As shown in Table 3-1, Examples 10 to 13 comprises caprylic/capric/myristic/stearic triglyceride, theobroma grandiflorum seed butter, or phytosteryl/behenyl/octyldodecyl lauroyl glutamate, all of which are uncrystallized high melting point oils. As shown in Table 3-1, Examples 10 to 13 comprising an uncrystallized high melting point oil each showed an improvement in the feel during use compared with Comparative example 5, which does not comprise an uncrystallized high melting point oil. Comparative Example 6 in which cetyl alcohol, an uncrystallized high melting point oil, was blended, did not form a uniform composition.

Test Example 3-2

Each of the ingredients were combined together and mixed according to the compositions shown in Table 3-2 to give the skin emulsion compositions of Comparative example 7, Examples 14 to 15. The pH and viscosity of the resulting emulsion composition for skin were determined in the same manner as in Test Example 1, and the feeling during use was evaluated in the same manner as in Test Example 3-1.

TABLE 3-2

| | Ingredient (% by weight) | Comp. Ex. 7 | Ex. 14 | Ex. 15 |
|---|---|---|---|---|
| 1 | Purified water | Balance | Balance | Balance |
| 2 | Acrylates/C10-30 alkyl acrylate crosspolymer | 0.5 | 0.5 | 0.5 |
| 3 | Adenosine phosphate | 3 | 3 | 3 |
| 4 | Tromethamine | q.s | q.s | q.s |
| 5 | Glycerin | 3 | 3 | 3 |
| 6 | Diglycerin | 1.5 | 1.5 | 1.5 |
| 7 | Pentylene glycol | 3 | 3 | 3 |
| 8 | Liquid paraffin | 8 | 7.8 | 7.5 |
| 9 | Stearoyl inulin | — | 0.2 | — |
| 10 | Dextrin myristate | — | — | 0.5 |
| | pH | 6.5 | 6.5 | 6.5 |

TABLE 3-2-continued

| Ingredient (% by weight) | Comp. Ex. 7 | Ex. 14 | Ex. 15 |
|---|---|---|---|
| Viscosity | 8500 | 9150 | 9100 |
| Thickness feeling | 3 | 3.5 | 4.25 |
| Richness feeling | 3 | 4 | 4.5 |
| Less stickiness feeling | 3 | 4.25 | 4.25 |
| Fresh feeling | 3 | 5 | 5 |
| Overall score | 12 | 16.75 | 18 |
| Comprehensive evaluation | — | ○ | ◉ |

Comp. Ex.: Comparative example
Ex.: Example
q.s: quantum sufficit

As shown in Table 3-2, Examples 14 to 15 comprise stearoyl inulin or dextrin myristate, both of which an oil-based gelling agent. Examples 14 to 15 comprising an oil-based gelling agent each showed an improvement in the feel during use compared with Comparative Example 7, which does not comprise an oil-based gelling agent.

Test Example 3-3

Each of the ingredients were combined together and mixed according to the compositions shown in Table 3-3 to give the skin emulsion compositions of Comparative example 8, Examples 16 to 17.

The pH and viscosity of the resulting emulsion compositions for skin were determined in the same manner as in Test Example 1, and the feeling during use was evaluated in the same manner as in Test Example 3-1.

TABLE 3-3

| | Ingredient (% by weight) | Comp. Ex. 8 | Ex. 16 | Ex. 17 |
|---|---|---|---|---|
| 1 | Purified water | Balance | Balance | Balance |
| 2 | Acrylates/C10-30 alkyl acrylate crosspolymer | 0.4 | 0.4 | 0.4 |

TABLE 3-3-continued

| | Ingredient (% by weight) | Comp. Ex. 8 | Ex. 16 | Ex. 17 |
|---|---|---|---|---|
| 3 | Cross-linked sodium polyacrylate | 0.2 | 0.2 | 0.2 |
| 4 | Adenosine phosphate | 2 | 2 | 2 |
| 5 | Potassium hydroxide | q.s | q.s | q.s |
| 6 | Cyclopentasiloxane | 5.5 | 5 | 5 |
| 7 | Aminopropyl dimethicone | — | 0.5 | — |
| 8 | Stearyl dimethicone | — | — | 0.5 |
| | pH | 6.5 to 7.0 | 6.5 to 7.0 | 6.5 to 7.0 |
| | Viscosity | 4550 | 4700 | 4750 |
| | Thickness feeling | 3 | 5 | 4 |
| | Richness feeling | 3 | 5 | 4.5 |
| | Less stickiness feeling | 3 | 4 | 4.75 |
| | Fresh feeling | 3 | 4 | 4 |
| | Overall score | 12 | 18 | 17.25 |
| | Comprehensive evaluation | X | ◎ | ◎ |

Comp. Ex.: Comparative example
Ex.: Example
q.s: quantum sufficit

As shown in Table 3-3, Examples 16 to 17 comprise aminopropyl dimethicone or stearyl dimethicone, both of which are silicone agents for improving feel. Examples 16 to 17 comprising a silicone agent for improving feel each showed an improvement in the feel during use compared with Comparative example 8, which does not comprise a silicone agent for improving feel.

Formulation Examples of Oil-In-Water Emulsified Cosmetics

All amounts are expressed in % by weight based on the total weight of the product.

<1. Emollient emulsion>

| | | |
|---|---|---|
| 1 | Adenosine phosphate | 0.5 |
| 2 | Acrylates/C10-30 alkyl acrylate crosspolymer | 0.3 |
| 3 | Sodium polyacrylate | 0.2 |
| 4 | BG | 4 |
| 5 | Glycerin | 4 |
| 6 | PEG/PPG/polybutylene glycol-8/5/3 glycerin | 2 |
| 7 | Cetyl ethylhexanoate | 3 |
| 8 | Cyclopentasiloxane | 2 |
| 10 | Isostearic acid | 0.5 |
| 11 | Hydrogenated polyisobutene | 3 |
| 12 | Aminopropyl dimethicone | 0.5 |
| 13 | Potassium hydroxide | 0.2 |
| 14 | Phenoxyethanol | 0.4 |
| 15 | Purified water | Balance |
| | TOTAL | 100 |

<2. Gel emulsion>

| | | |
|---|---|---|
| 1 | Adenosine phosphate | 3.0 |
| 2 | Acrylates/C10-30 alkyl acrylate crosspolymer | 0.5 |
| 3 | Carboxyvinylpolymer | 0.1 |
| 4 | Sorbitol culture polysaccharide solution | 1 |
| 5 | POE methylglucoside | 2 |
| 6 | BG | 4 |
| 7 | Glycerin | 4 |
| 8 | Cyclopentasiloxane | 5 |
| 9 | Highly polymerized dimethicone | 0.5 |
| 10 | Tromethamine | q.s |
| 11 | Paraben | 0.25 |
| 12 | Purified water | Balance |
| | TOTAL | 100 |

<3. Sunscreen emulsion>

| | | |
|---|---|---|
| 1 | Adenosine phosphate | 1 |
| 2 | Cyclomethicone | 4 |
| 3 | Phytosteryl macadamiate | 0.4 |
| 4 | C12-15 alkyl benzoate | 2 |
| 5 | 2-ethylhexyl p-methoxycinnamate | 7 |
| 6 | Octocrylene | 2 |
| 7 | Diethylamino hydroxybenzoyl hexyl benzoate | 3 |
| 8 | Acrylates/C10-30 alkyl acrylate crosspolymer | 0.2 |
| 9 | PEG-240/HDI copolymer bis-decyltetradeceth-20 ether | 0.5 |
| 10 | Concentrated glycerin | 4 |
| 11 | 1,3-Butylene glycol | 3 |
| 12 | Ethanol | 5 |
| 13 | Potassium hydroxide | q.s |
| 14 | Phenoxyethanol | 0.3 |
| 15 | Purified water | Balance |
| | TOTAL | 100 |

<4. Cleansing milk>

| | | |
|---|---|---|
| 1 | Adenosine phosphate | 3 |
| 2 | Cyclomethicone | 10 |
| 3 | PEG-7 glyceryl cocoate | 5 |
| 4 | Stearoyl inulin | 0.4 |
| 5 | Acrylates/C10-30 alkyl acrylate crosspolymer | 0.4 |
| 6 | Sodium polyacrylate | 0.2 |
| 7 | 1,3-Butylene glycol | 15 |
| 8 | Potassium hydroxide | q.s |
| 9 | Paraben | 0.3 |
| 10 | Purified water | Balance |
| | TOTAL | 100 |

The invention claimed is:
1. An O/W emulsion composition,
comprising Ingredient (A), Ingredient (B), Ingredient (C), Ingredient (D), Ingredient (E), and Ingredient (F),
wherein
Ingredient (A): an adenosine phosphate and/or a salt thereof;
Ingredient (B): an acrylic acid-alkyl methacrylate copolymer;
Ingredient (C): a water-soluble polymer selected from
a swelling thickener selected from the group consisting of sodium polyacrylate, ammonium polyacrylate, acrylamide/sodium acrylate copolymer, vinylpyrrolidone/2-acrylamide-2-methylpropanesulfonic acid copolymer, a mixture of polyacrylamide and sodium polyacrylate, sodium acrylate/2-acrylamide-2-methylpropanesulfonic acid copolymer, hydroxyethyl acrylate/2-acrylamide-2-methylpropanesulfonic acid copolymer, and a mixture thereof,
a urethane associative thickener selected from the group consisting of PEG-240/HDI copolymer bis-decyltetradeceth-20 ether, PEG-150/stearyl alcohol/SMDI copolymer, PEG-150/decyl alcohol/SMDI copolymer, polyurethane-59 and a mixture thereof, and
a mixture of the swelling thickener and the urethane associative thickener;
Ingredient (D): a pH adjuster which is an organic alkali compound selected from the group consisting of tromethamine, aminomethyl propanediol, aminomethyl propanol, and a mixture thereof;
Ingredient (E): an oil content;
Ingredient (F): water, and wherein the composition has a viscosity of less than 10,000 mPa·s.

2. The composition according to claim 1, wherein Ingredient (B) is an acrylic acid-alkyl methacrylate copolymer having a molecular weight of 100,000 to 5,000,000.

3. The composition according to claim 1, wherein Ingredient (C)/Ingredient (A) (weight ratio) is 0.01 to 30.

4. The composition according to claim 1, wherein Ingredient (C)/(Ingredient (A)+Ingredient (B)) (weight ratio) is 0.005 to 20.

5. The composition according to claim 1, wherein Ingredient (C)/Ingredient (B) (weight ratio) is 0.05 to 60.

6. The composition according to claim 1, wherein the composition has a pH of 5.5 to 7.5.

7. The composition according to claim 1,
wherein Ingredient (B) is an acrylates/C10-30 alkyl acrylate crosspolymer,
Ingredient (C) is a cross-linked sodium polyacrylate and/or PEG-240/HDI copolymer bis-decyltetradeceth-20 ether, and
the composition has a viscosity of 1,500 mPa·s or more and less than 10,000 mPa·s.

8. The composition according to claim 1,
wherein Ingredient (B) is an acrylates/C10-30 alkyl acrylate crosspolymer,
Ingredient (D) is tromethamine, and
the composition has a viscosity of 1,500 mPa·s or more and less than 10,000 mPa·s, and a pH of 6 to 7.

9. The composition according to claim 1, wherein the composition comprises
0.001 to 10% by weight of Ingredient (A),
0.05 to 2% by weight of Ingredient (B), and
0.1 to 50% by weight of Ingredient (E).

10. The composition according to claim 1, wherein the composition comprises 0.01 to 10% by weight of Ingredient (C).

11. The composition according to claim 1 comprising
Ingredient (A): an adenosine phosphate and/or a salt thereof 0.4 to 3.5% by weight;
Ingredient (B): acrylates/C10-30 alkyl acrylate crosspolymer 0.2 to 0.4% by weight;
Ingredient (C): cross-linked sodium polyacrylate and/or PEG-240/HDI copolymer bis-decyltetradeceth-20 ether 0.04 to 0.8% by weight;
Ingredient (E): an oil content 5 to 8% by weight; and
Ingredient (F): water,
wherein the composition has a viscosity of 1,500 mPa·s or more and less than 10,000 mPa·s.

12. The composition according to claim 1 comprising
Ingredient (A): an adenosine phosphate and/or a salt thereof 0.4 to 3.5% by weight;
Ingredient (B): acrylates/C10-30 alkyl acrylate crosspolymer 0.2 to 0.4% by weight;
Ingredient (D): tromethamine and/or aminomethyl propanediol;
Ingredient (E): an oil content 5 to 8% by weight; and
Ingredient (F): water,
wherein the composition has a viscosity of 1,500 mPa·s or more and less than 10,000 mPa·s, and a pH of 6 to 7.

13. The composition according to claim 1, wherein
the composition does not comprise a pH adjuster which is an inorganic alkali compound, or,
the composition comprises a pH adjuster which is an inorganic alkali compound, and the pH adjuster which is an inorganic alkali compound/Ingredient (D) (weight ratio) is 0.1 or less.

14. The composition according to claim 1,
wherein Ingredient (E) comprises Ingredient (G) selected from:
an uncrystallized high melting point oil having a melting point of 30° C. or higher selected from an uncrystallized triglyceride having a melting point of 30° C. or higher; an uncrystallized sterol fatty acid ester having a melting point of 30° C. or higher; petrolatum; and a mixture thereof;
an oil-based gelling agent selected from an inulin fatty acid ester, a dextrin fatty acid ester, polyglycerol, dibutyl ethylhexanoyl glutamide, dibutyl lauroyl glutamide, sodium dilauramidoglutamide lysine, vinyl dimethicone/methicone silsesquioxane crosspolymer, PEG/PPG-19/19 dimethicone, and a mixture thereof;
a silicone agent for improving feel selected from an amino-modified silicone, a silicone wax, polyether-modified silicone, highly polymerized dimethicone, a silicone emulsion, a silicone powder, and a mixture thereof; and
a mixture thereof, and
wherein the amount of Ingredient (G) is 0.1 to 50% by weight based on Ingredient (E).

15. The composition according to claim 14, wherein the composition comprises 0.1 to 5% by weight of Ingredient (G).

16. The composition according to claim 1, wherein the composition further comprises
Ingredient (H): a water-soluble humectant.

* * * * *